United States Patent
Eder et al.

(10) Patent No.: US 6,577,710 B1
(45) Date of Patent: Jun. 10, 2003

(54) METHOD FOR CHECKING A SWITCHING CENTER, LINE UNIT AND SWITCHING CENTER FOR IMPLEMENTING THE METHOD, AS WELL AS AN APPERTAINING COMPUTER PROGRAM

(75) Inventors: Michael Eder, Soyen (DE); Klaus Leutner, Unterhaching (DE); Siegmar Riedel, Munich (DE); Burkhard Zittinger, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 40 days.

(21) Appl. No.: 09/644,760

(22) Filed: Aug. 23, 2000

(30) Foreign Application Priority Data

Aug. 23, 1999 (EP) .............................................. 99116507

(51) Int. Cl.$^7$ ........................... H04M 1/24; H04M 3/08; H04M 3/22
(52) U.S. Cl. ...................... 379/15.01; 379/9; 379/15.04; 379/17
(58) Field of Search ................................ 379/1.01, 1.03, 379/9–9.06, 14, 14.01, 13, 15.01, 15.02, 15.04, 15.05, 17, 219, 220.01–221.01, 229–230

(56) References Cited

U.S. PATENT DOCUMENTS 4,366,350 A 12/1982 Lee et al.
5,488,648 A 1/1996 Womble

FOREIGN PATENT DOCUMENTS

DE 26 36 297 A1 * 2/1978
EP 0 211 261 2/1987

* cited by examiner

Primary Examiner—Duc Nguyen
(74) Attorney, Agent, or Firm—McCormick, Paulding & Huber LLP (57) ABSTRACT

A method for checking a switching center is explained, whereby reference data are checked in the memory of the switching center. On the basis of status data, a processor determines the operational status of programs, which utilize the reference data (step 408). The corresponding reference datum is read for this purpose (steps 410, 416). If the reference datum has a value that is not admissible for the determined operational status, an error treatment is performed (steps 412, 414).

9 Claims, 7 Drawing Sheets

METHOD FOR CHECKING A SWITCHING CENTER, LINE UNIT AND SWITCHING CENTER FOR IMPLEMENTING THE METHOD, AS WELL AS AN APPERTAINING COMPUTER PROGRAM

BACKGROUND OF THE INVENTION

1. Field of the Invention

The present invention relates to a method for checking a switching center. Switching-oriented processes are carried out in the switching center during the execution of application programs.

2. Description of the Related Art

The signaling for a first subscriber exemplifies such a switching-oriented process. Switching-oriented processes generally relate to the control of the connection during the setup or cleardown of a connection between the first subscriber and a second subscriber. The execution of the application programs is controlled by an operating system, which serves as a link between the application programs and the other electronic components of the computer. The operating system controls different operating functions of the computer and assumes the operation of central tasks such as the administration of the memory and the driving of the device.

Generally, an application program, performs the signaling and the control of the connection. With the signaling data and call data processed by it. However, due to its size, application programs used for the signaling and the control of the connection, have been very complex. This results in a high costs associated with their preparation and maintenance. Moreover, as of now, a separate application program has been utilized for each transmission protocol that can occur at a subscriber line or inter-exchange signaling. This, further renders the preparation and maintenance of the application programs more difficult.

However, the application programs can be simply prepared and maintained if a signaling program is used for signaling and when a subscriber connection program is used for the control of the connection. The signaling program and subscriber connection program are different programs that are independently programmed and tested. Both programs mutually send each other messages with the aid of the operating system. Also, the switching center contains a signaling program for each speaking subscriber. The same instruction sequence can be accessed during the processing of the signaling programs. This is also referred to as incarnations of the signaling program. There can also be a plurality of incarnations with respect to the subscriber connection program.

Each signaling program accesses the pertinent data set. The signaling data set, among other things, contains a status data indicating the operating state of the accessing signaling program. A call data set for the access of the respective subscriber connection program also belongs to each subscriber connection program.

During the setup and cleardown of a connection between two subscribers, a signaling program works together with a partner subscriber connection program. For example, the signaling data set contains at least one reference data with respect to the partner call data set.

In an error-free operation, there are no allocation problems between the signaling data sets and the signaling programs, on the one hand, and the call data sets, on the other hand. Measures for checking the allocation are also not known. However, erroneous or invalid allocations can arise as a result of errors during the programming and during equipment failures of the switching center.

SUMMARY OF THE INVENTION

The present invention is based on the object of proposing a simple method for checking the switching center and particularly the allocation of the data sets to the programs. The invention is further based on the object of proposing a line unit and a switching center, as well as a pertinent computer program for implementing the checking method.

The objectives are achieved by storing in a memory unit of the switching center a signaling data set. This signaling data set is accessed by a signaling program that is used for signaling for a first subscriber. The signaling data set contains a status data that indicates the state of operation for the accessing signaling program. A connection data set is stored in the memory unit of the switching center. This connection data set, which is accessed by a connection program, is used for controlling the connection between a first subscriber and a second subscriber. The signaling data also contains a reference data for referring to the connection data set.

Based on the status data of the signaling data set, the present method detects the operating state of the accessing signaling program. The reference data of the signaling data set is then read. In case the reference data has an inadmissible value for the determined operating state, an error treatment is carried out. This measure guarantees that an erroneous allocation of signaling data set and signaling program is recognized on time. Accordingly, sequential error cases can be precluded. Furthermore, it becomes possible to release the storage space again, which is occupied by erroneous allocations in the switching center.

In another embodiment of the present invention, the cited steps are carried out during the processing of a checking program, which is not a part of the signaling or subscriber connection program. As such, the switching center is checked independent of the status of the signaling or the subscriber connection programs. The checking program is started, for example, at times at which the switching center is not loaded.

In another embodiment the call data set contains a status data indicating the status of the accessing subscriber connection program. The call data set contains a reference data referring to the signaling data set, which is accessed by the partner signaling program, so that the subscriber connection program can detect the partner signaling program with which it cooperates. However, the reference data can also refer to another call data set, which is accessed by another subscriber connection program with which cooperation ensues as well. The preceding steps for checking the allocation are also carried out regarding the data of the call data set. Thus, allocation errors between call data sets and subscriber connection programs can be found.

If the steps are carried out for each signaling data set and for each subscriber data set, a complete checking ensues. Preferably, the checking is cyclically performed, so that the check of the first data set is started again after all data sets have been checked. The check either ensues with interruptions or without interruptions of the cycle, whereby the processor can assume different tasks, such as switching tasks, during interruptions.

In an embodiment of the invention, a fixed value of the status data indicates a quiescent state in which the accessing program is not processed. If a data set is found in which the status data has the value for the quiescent state, only a fixed reference value indicating that a reference is not present, is admissible for the reference data. Such a reference value is the reference value zero, for example. In this context, this is also referred to as zero-pointer, since the reference value does not point to a valid data set. Allocation errors can be simply recognized in that the reference data exhibits a value deviating from the fixed reference value in the quiescent state. Given an operating state deviating from the quiescent state, an erroneous allocation, on the other hand, can be simply recognized, since the reference value does not point to the beginning of a data set, for example.

In another embodiment of the invention, an error message is entered into an error file during the error treatment. The operator can eliminate the error at a later point in time on the basis of the error message. If the errors are automatically eliminated, the operator can discover the causes for the error message on the basis of the error message.

In another embodiment, an admissible reference data is written into the storage unit in the location of the inadmissible reference data. A simple error treatment results.

Furthermore, the invention relates to a line unit and to a switching center, as well as to a computer program by means of which the inventive method is implemented. Therefore, the above cited technical effects are also valid for the line unit, the switching center and the computer program.

DETAILED DESCRIPTION OF THE PREFERRED EMBODIMENTS

Figure 1:
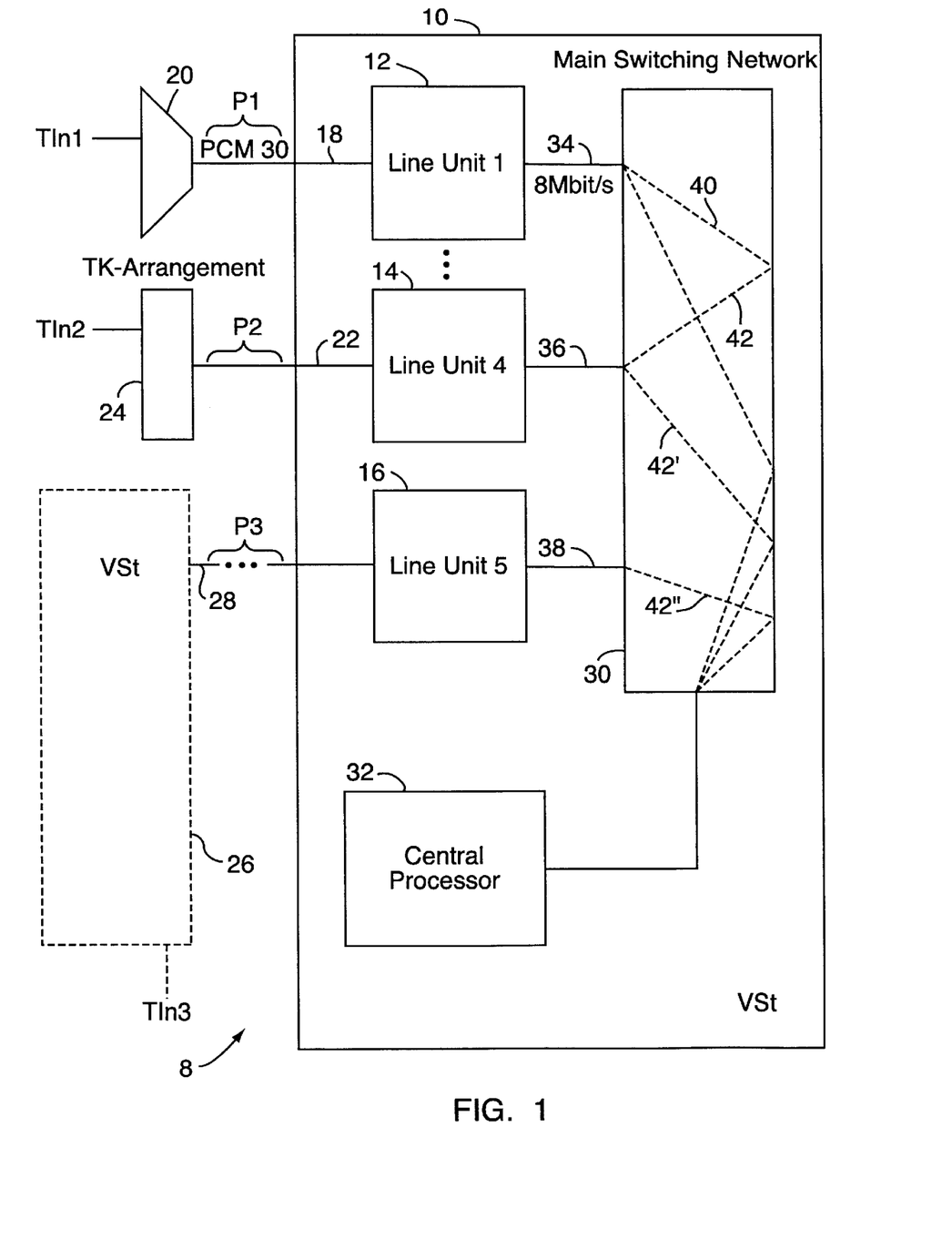
FIG. 1 depicts a switching center with a plurality of line units.
Figure 2:
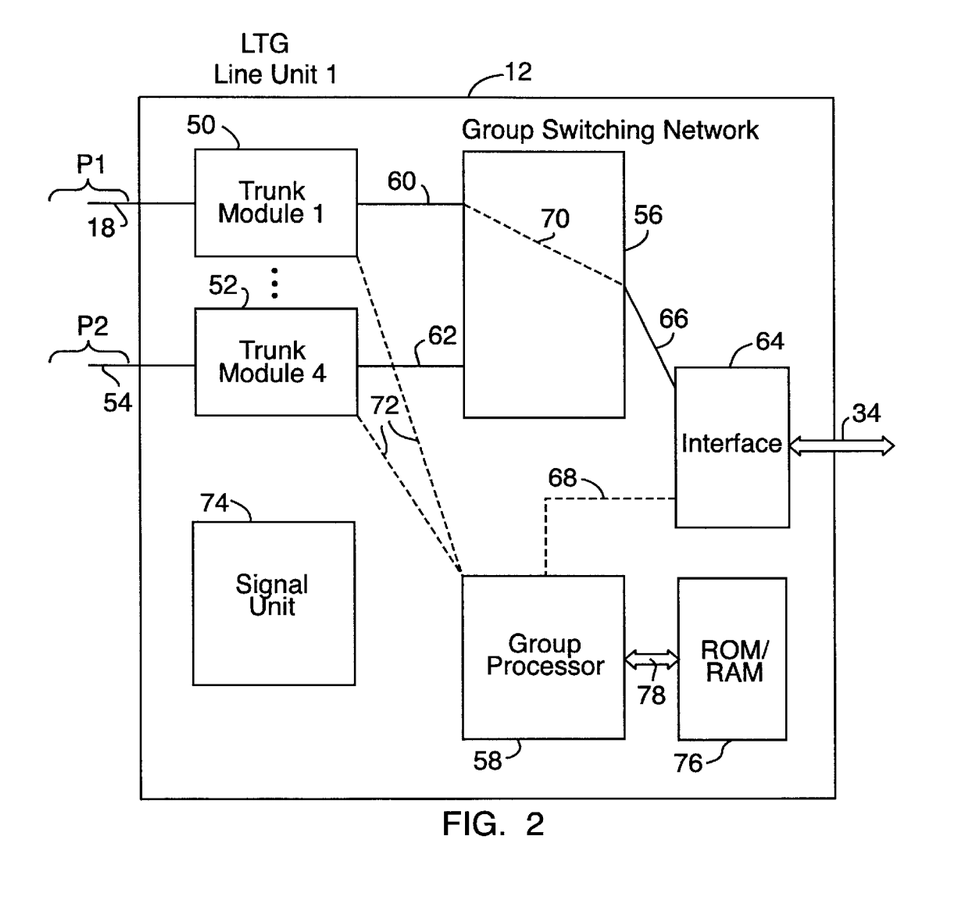
FIG. 2 depicts a line unit with a plurality of trunk modules.

FIG. 1 shows, in a telecommunication network 8, a local switching center 10 (abbreviated as VSt) with a plurality of line units 12 through 16, whose construction is explained on the basis of the line unit 12 in FIG. 2. Further line units arranged between the line units 12 and 14 are indicated by points.

A trunk line 18 connects the line unit 12 to a concentrator unit 20, whereby a plurality of subscribers are connected to it (FIG. 1 shows a subscriber Tln1). On one hand, the concentrator unit 20 concentrates the lines coming from the subscribers such that only one line must be utilized for transmitting the voice data to the switching center 10. On the other hand, the concentrator unit 20 divides the voice data received via the line 18 into the access lines of the subscribers. A PCM30 system (PCM=Pulse Code Modulation) is used on the trunk line 18, i.e., 30 speech channels are available. The PCM voice data are transmitted according to a first protocol P1, which is a SIEMENS-internal protocol. However, standardized protocols are also utilized as protocol P1, for example the protocols MULDEX, V51 or V52.

A plurality of PCM30 systems or PCM24 systems with 24 voice channels can also be utilized on the trunk line 18.

A trunk line 22 connects the trunk module 14 to a telecommunication device 24. The telecommunication device 24 enables a company to switch an internal communication traffic or, respectively, to set up connections to the outside, for example. One of the subscribers connected to the telecommunication device 24 is shown as subscriber Tln2 in FIG. 1. The voice data are transmitted between the telecommunication device 24 and the line unit 14 according to a protocol P2, which differs from the protocol P1.

The line unit 16 is connected via a trunk line 28 to a further switching center 26. The voice and signaling data are transmitted on the trunk line 28 according to a protocol P3, which has been selected from protocols that are specifically designed for connecting two switching centers. A connection from the subscriber Tln1 to a subscriber Tln3 connected to the switching center 26 is set up by means of the line unit 16.

The switching center 10 also contains a main switching network 30 and a central processor 32. All line units 12 through 16 are connected via trunk lines 34 through 38 to the switching network 30. Each trunk line 34 through 38 has a transmission capacity of eight Mbit per second, so that voice or, respectively, control data can be respectively transmitted via 128 transmission channels. The central processor 32 controls the switching of lines in the switching network 30. For example, the central processor 32 switches a voice channel 40 via which the subscriber Tln1 can speak to the subscriber Tln2. Before, the line unit 16 utilizes a message channel 42 in order to inform the central processor 32 about the subscriber Tln1 wishing to set up a connection to the subscriber Tln2. After the line has been through-connected, further control data are exchanged between the line units 12 through 16 and the central processor via the message channel 42 or, respectively, via the message channels 42', 42".

The line unit 16 shown in FIG. 1 is utilized for the signaling between the switching centers 10 and 26. The line units 12, 14 and 16 contain signaling programs and subscriber connection programs, which respectively exchange data via a message interface.

FIG. 2 shows the construction of the line unit 12 containing four trunk modules (Figure shows two trunk modules 50 and 52). The trunk line 18 is connected to the trunk module 50. The trunk module 50 is capable of working according to protocol P1.

A line 54 leading to a further telecommunication device (not shown) is connected to the trunk module 52. The protocol that is utilized for the transmission via the trunk line 54 is the protocol P2. The trunk module 52 is capable of working according to protocol P2 for telecommunication devices.

Furthermore, the line unit 12 contains a group switching network 56 and a group processor 58. The trunk module 50 through 52 are connected via trunk lines 60 through 62 to the group switching network 56, so that connections between the line units 50 through 52 and an interface 64 can be switched in the group switching network. The interface 64 is connected via a trunk line 66 to the group switching network 56 and is connected via a trunk line 68 to the group processor 58. The trunk line 34 is connected on the other side of the interface 64.

The connection 40 from the subscriber Tln1 to the subscriber Tln2 (shown in FIG. 1) is switched upon utilization of a connection 70 in the switching network 56. The transmission channel for the connection from the subscriber Tln1 to the subscriber Tln2 therefore is switched via the trunk line 18, the trunk module 50, the trunk line 60, the connection 70, the trunk line 66, the interface 64 and the trunk line 34.

The trunk modules 50 through 52 are connected via a bus system 72 to the group processor 58. The group processor 58 can control the switching of connections in the group switching network 56 via the bus system 72.

The line unit 12 also contains a signal unit 74, which, among other things, contains a tone generator, a ringing current generator, a counting impulse generator and a double-tone selection call receiver (DTMF-Dual Tone Multifrequency). The signal unit 74 is connected via connections (not shown) to the trunk modules 50, 52, to the group switching network 56 and to the group processor 58.

Moreover, the line unit 12 contains a storage unit 76, which is connected via a bus 76 to the group processor 58. Signaling and subscriber connection programs are stored in the storage unit 76, whereby the signaling and the connection control are realized during the processing of said signaling and subscriber connection programs by means of the group processor 58.

Figure 3:
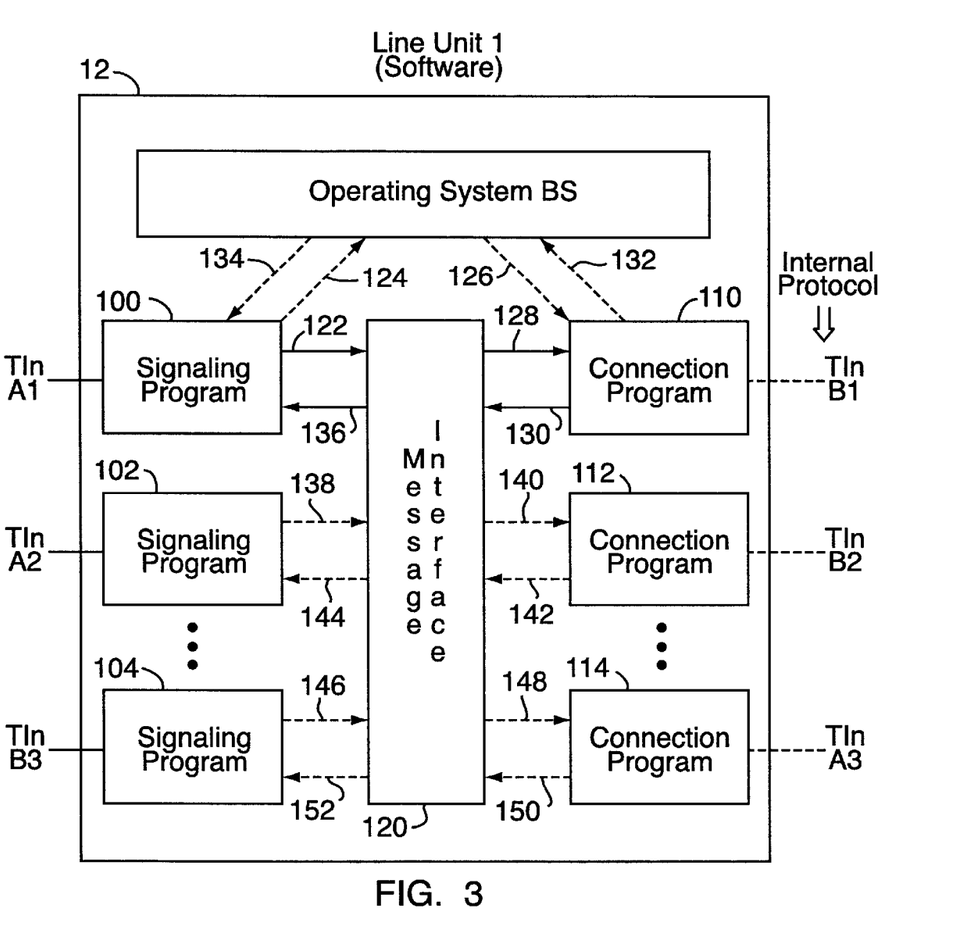
FIG. 3 depicts an illustration of the operational sequences in the line unit.

FIG. 3 shows operational sequences occurring in the line unit 12. Given the processing of the commands of an operating system BS that is also stored in the memory 76 by the group processor 58, the circuits contained in the line unit 12 are driven, for example the trunk modules 50, 52 or the interface 64. The operating system BS therefore is the link between the circuit-oriented components in the line unit 12 and what are referred to as application programs, whereby the line unit 12 executes switching-oriented functions during the processing of said application programs. FIG. 3 shows signaling programs 100 through 104 and subscriber connection programs 110 through 114 of these application programs.

The signaling program 100 is utilized for a connection, which a subscriber T1nA1 connected to the line 18 sets up to a subscriber T1nB1. During the processing of the signaling program 100, the signaling is carried out at the trunk module 50, so that voice data and signaling data are transmitted according to protocol P1. Besides, the subscriber connection program 110 is used for connecting the subscriber T1nA1 to the subscriber T1nB1. During the processing of the subscriber connection program 110, the connection control is executed, i.e., the connection setup, the through-switching of the group switching network etc., as well as the connection cleardown. Data are exclusively exchanged between the signaling program 100 and the subscriber connection program 110 via a message interface 120. Not only the signaling program 100 but also the subscriber connection program 110 work according to the status/event principle. This means that statuses are fixed in which specific external events are defined, which, in turn, result in other statuses. An example for this status/event principle is explained further below. The operating system BS is used for the data exchange via the message interface 120, so that the signaling program 100 and the subscriber connection program 110 can also work according to the status/event principle among one another.

If, for example, data are to be transmitted from the signaling program 100 via the message interface 120 to the subscriber connection program 110, the signaling program generates a status block, which (as explained below on the basis of FIG. 4) is stored in a storage area in the memory 76 of the line unit 12, which storage area is fixed before (compare arrow 122). Subsequently, the signaling program 100 informs the operating system BS about the generation of the status block (compare arrow 124). The operating system controls the operational sequence of the application programs 100 through 114. On the basis of the message indicated by the arrow 124, the operating system BS recognizes that the signaling program 100 has generated a status block for the pertinent subscriber connection program 110. As a result thereof, the operating system BS initiates the processing of the subscriber connection program 110 (compare arrow 126). During the processing of the subscriber connection program 110, the status block stored in the memory is read (compare arrow 128). The subscriber connection program 110 processes the message contained in the status block. Subsequently, a fixed status is reached again during the processing of the subscriber connection program 110. Then, the subscriber connection program 110 waits for a new event. This event arrives from the side of the subscriber T1nB1, for example, whereupon the operating system BS initiates the execution of the subscriber connection program 110 again.

If messages or data are to be transmitted to the signaling program 100 during the processing of the subscriber connection program 110, the message interface 120 is also used. For this purpose, a status block that is stored in the memory is used (compare arrow 130). Subsequently, the subscriber connection program 110 informs the operating system BS about the generation of the status block (compare arrow 132). The operating system BS initiates the appertaining signaling program 100 to start again (compare arrow 134). During the processing of the signaling program 134, the status block generated by the subscriber connection program 110 is then read (arrow 136). The structure of the status block is explained in greater detail further below on the basis of FIG. 4.

In the example according to FIG. 3, the subscriber T1nA2 initiates a further connection between a subscriber T1nA2 connected to the trunk module 52 and a subscriber T1nB2. Given the connection between the subscriber T1nA2 and the subscriber T1nB2, the signaling program 102 is used for the signaling according to the protocol P2. The trunk module 52 is driven during the processing of this signaling program 102. Therefore, the signaling programs 100 and 102 differ, since they drive circuit-oriented components, which generate signals according to different protocols P1 and P2.

Furthermore, the subscriber connection program 112 is used for the connection control for connecting the subscribers T1nA2 and T1nB2. The connection control is independent of the utilized signaling protocol P1 or, respectively, P2, so that the same subscriber connection program is utilized for the connections 110 and 112. However, different incarnations are concerned, whereby the last executed processing step is always stored with respect to said incarnations. There is only one instruction sequence for the subscriber connection programs 110 and 112 in the memory of the line unit 12. An imagined interface is allocated to each subscriber connection program 110 or, respectively, 112; a connection data set SLST belongs to said interface. The data fields of a connection data set SLST are explained in greater detail on the basis of FIG. 5. On the basis of the connection data sets SLST appertaining the subscriber connection program 110 or, respectively, 112, the last processing status can be determined and the processing can be continued in this status.

The message interface 120, in turn, is used when messages are exchanged between the signaling program 102 and the appertaining subscriber connection program 112 (compare arrows 138 through 144). During the processing of the signaling program 102 or, respectively, during the processing of the subscriber connection program 112, status blocks are exchanged in the same way as explained above for the signaling program 100 and the subscriber connection program 110. The operating system BS is also used during the exchange of status blocks between the signaling program 102 and the subscriber connection program 112 (although this is not shown in FIG. 3).

Furthermore, FIG. 3 shows a connection between a subscriber T1nA3 and a subscriber T1nB3, whereby this connection has been initiated by the subscriber T1nA3 at the switching center 26 (compare FIG. 1), whereby the subscriber T1nB3 is connected to the concentrator unit 20. The signaling program 104 and the subscriber connection program 114 are utilized for connecting the subscriber T1nA3 and T1nB3. The subscriber connection program 114 differs from the subscriber connection program 110 or, respectively, 112, since the connection control is to be carried out in a different way on the called B-side than the signaling on the calling A-side. The signaling program 104 contains the same instruction sequences as the signaling program 100, since both signaling programs 100 and 104 work according to the same protocol P1 and since the protocol P1 is a what is referred to as double-directed protocol, which works in the same way in the direction to the calling A-subscriber as in the direction to the called B-subscriber. The message interface 120 is utilized for the exchange of status blocks between the subscriber connection program 104 and the signaling program 114 (compare arrows 146 through 152), whereby the operating system BS is used.

The signaling programs 100 and 102 are incarnations of the same program. This means that the same instruction sequence is used for executing the signaling program 100 and the signaling program 102, so that said instruction sequence must be stored only once in the memory 76. This is possible, since the status of the respective signaling program—i.e., the last performed processing step, for example—is entered in the corresponding signaling data sets LST. The data fields of a signaling data set LST are explained below on the basis of FIG. 5.

Figure 4:
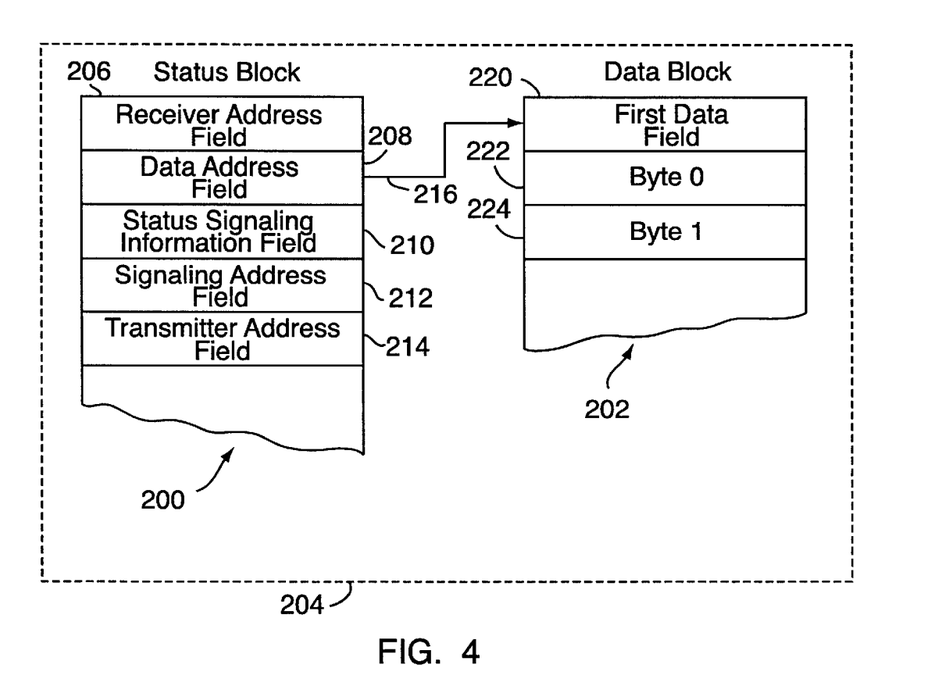
FIG. 4 depicts a status block with an appertaining data block.

FIG. 4 shows an example for a status block 200 and a pertinent data block 202, which are stored in a memory 204 of the line unit 12. The status block 200 contains a receiver address field 206, a data address field 208, a status signaling information field 210, a transmitter signaling information field 212 and a transmitter address field 214. The address of the signaling program 100 through 104 or of the subscriber connection program is stored in the receiver address field 206, for which the status block 200 is determined. On the basis of the receiver address in the receiver address field 206, the operating system BS determines the application program 100 through 114, whereby the status block 200 is to be processed by it.

The address of a first data field 220 of the data block 202 is contained in the data address field 208. During the processing of the status block 200, the data block 202 can be accessed on the basis of the data address 208 (compare arrow 216).

The type of message contained in the status block 200 is indicated in the message signaling information field 210. Therefore, the status block 200 can be processed dependent on the type of the message.

The signaling information of the application program 100 through 114, which has generated the status block 200, is entered into the transmitter signaling information field 212. The address of the application program 100 through 114, which has generated the status block 200, is entered into the transmitter address field 214. The data fields 212 and 214 are potentially evaluated when the status block 200 is processed.

In addition to the first data field 220, the data block contains further data fields 222, 224 etc., in which data to be transmitted-are stored. The address of the application program 100 through 114, which has generated the data block 202, is stored in the data field 220 as well as in the data field 214.

In another exemplary embodiment (not shown), other additional data fields are contained in the status block 200 or in the data block 202.

Figure 5:
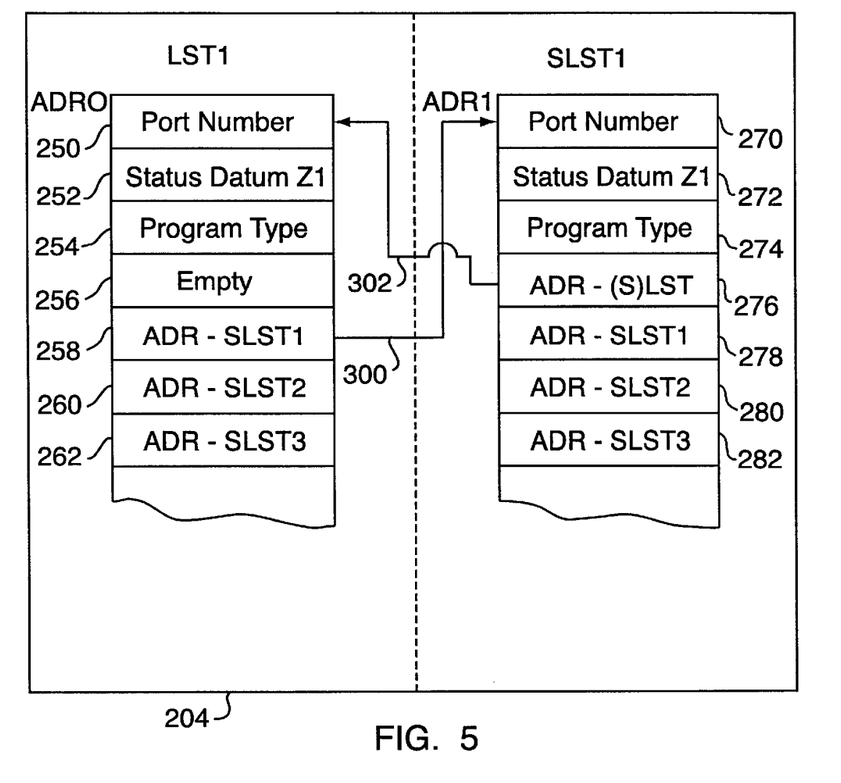
FIG. 5 depicts the data fields of a signaling data set and of a call data set.

FIG. 5 shows the data fields of a signaling data set LST1 and of a connection data set SLST1. The signaling data set LST1 occupies successive memory cells 250 through 262 starting at an address ADR0 in the memory 204. The connection data set SLST1 occupies successive memory cells 270 through 282 in the memory 204 starting at an address ADR1. Therefore, the data of the signaling data set LST1 or of the connection data set SLST1 occupy one storage block of the memory 204.

The signaling program 100 accesses the data of the signaling data set LST1, so that the signaling data set LST1 belongs to the signaling program 100. Each signaling data set belongs to a physically present interface of a subscriber, for example to a voice channel. A fixed number for this interface is entered into the memory cell 250 of the signaling data set LST1. The status of the signaling program 100 is entered into memory cell 252 in a status data Z1. On the basis of the value of the status data Z1, the last status therefore can be detected at any time subsequent to an interruption and the processing can be continued again in this status. The program type of the program accessing the signaling data set LST1 is, i.e., the type of the signaling program 100, is stored in the memory cell 254.

The memory cell 256 does not contain a valid data in the signaling data set LST1. However, this memory cell is necessary in order to assure that the signaling data set LST1 and the connection data set SLST1 are identically structured. A reference data ADR-SLST1, which has the value of the address ADR1 and therefore refers to the beginning of the connection data set SLST1, is stored in the memory cell 258 (also compare arrow 300). On the basis of this reference, the signaling program 100 can determine the connection data set SLST1, which belongs to the subscriber connection program 110, with which the signaling program 100 cooperates.

Further references with respect to connection data sets can be stored in the memory cells 160 and 262. The exemplary embodiment according to FIG. 5, however, does not show further references stored in the memory cells 260 and 262.

As is has already been mentioned above, an imagined interface is allocated to the connection data set SLST1. This interface is not of physical importance. As a result of the utilization of imagined interfaces, the connection data sets SLST can be essentially structured in the same way as the signaling data sets LST and the subscriber connection program can also access the connection data sets SLST in a similar way compared to the access of the signaling programs to the signaling data sets LST. The number of an imagined interface allocated to the subscriber connection program 110 is stored in the memory cell 270. The status of the connection program 110 is stored in the memory cell 272 in a status data Z2. The value of the status data Z2 is updatad when the subscriber connection program is executed, so that the processing can be continued again in the last status after an interruption. The program type of the subscriber connection program 110 accessing the connection data set SLST1 is stored in the memory cell 274. Messages are sent via the message interface dependent on the program type.

A reference data ADR-(S)LST, whose value is the address ADR0, is stored in the memory cell 276. Therefore, the reference data ADR-(S)LST refers to the beginning of the signaling data set LST1 (compare arrow 302).

References to further connection data sets SLST can be stored in the memory cells 278 through 282. In the exemplary embodiment according to FIG. 5, references are not stored in the memory cells 278 through 282.

There are mutual references in the signaling data set LST1 and in the connection data set SLST1 (as indicated by arrows 300 and 202). These references are allowable as long as the status data Z1, Z2 exhibit a value indicating an status that is different from the quiescentstatus. The signaling program 100 and the subscriber connection program 110 are not processed in the quiescentstatus.

Figure 6:
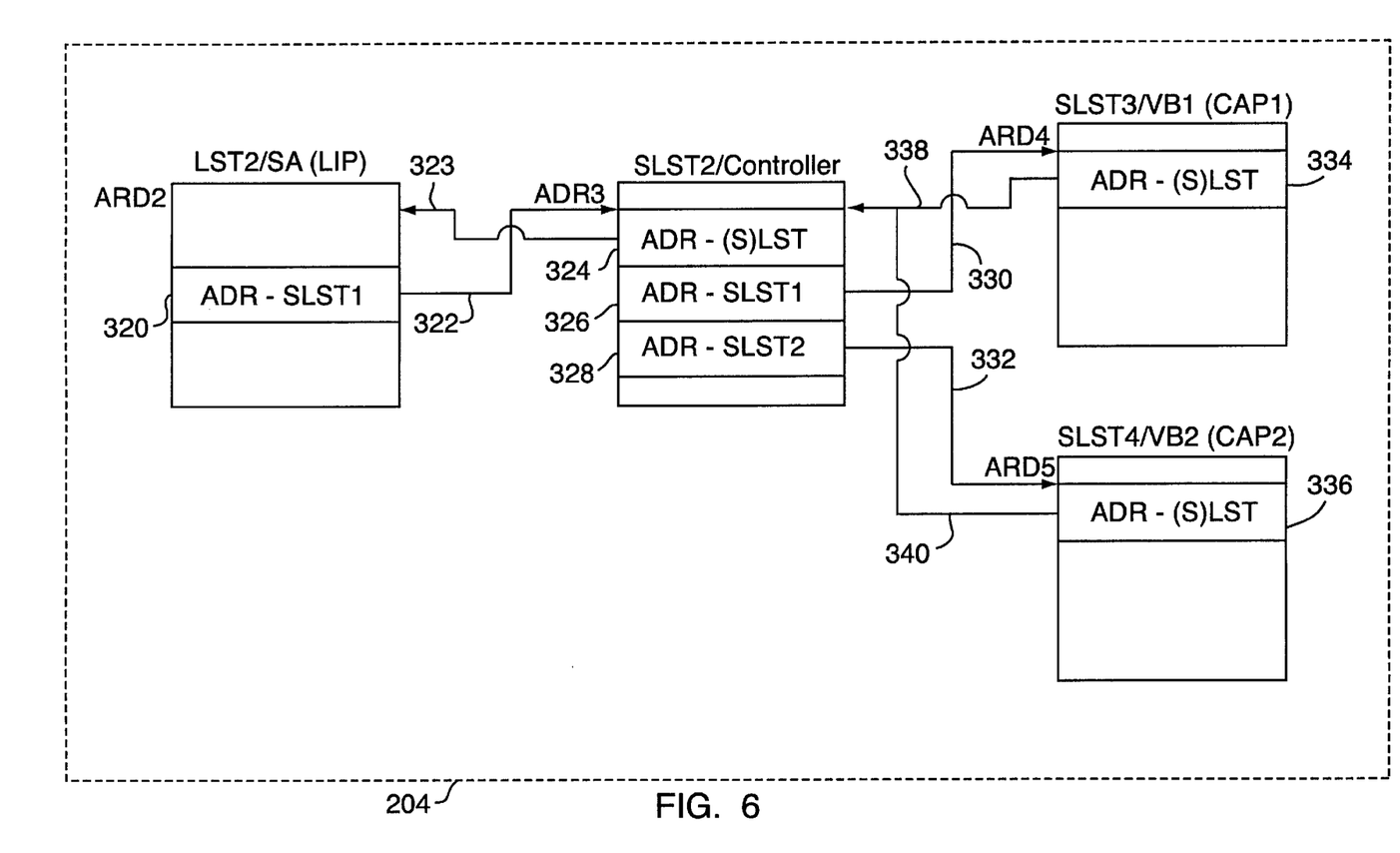
FIG. 6 depicts the chaining of data sets with respect to a what is referred to as three-party conference circuit.

FIG. 6 shows the chaining of a signaling data set LST2 and of three connection data sets SLST2, SLST3 and SLST4, as it occurs in a what is referred to as three-party conference circuit allowing three subscribers to speak at the same time. The data sets LST2, SLST2, SLST3 and SLST4, in turn, are stored in the memory 204. The signaling data set LST2 is stored starting at an address ADR2 and is structured in the same way as the signaling data set LST1 (compare FIG. 5). For reasons of clarity, FIG. 6, however, only shows the reference data ADR-SLST1 of the signaling data set LST2 in a memory cell 320. A signaling program SA for the connection on the A-side accesses the data of the signaling data set LST2. As the value of the reference data ADR-SLST1, the signaling program SA enters the value of an address ADR3 at which the connection data set SLST2 starts in the memory 204 (compare arrow 322).

The connection data set SLST2 is structured in the same way as the connection data set SLST1 (compare FIG. 5). However, FIG. 6 only shows three memory cells 324 through 328 of the connection data set SLST2. A reference data ADR-(S)LST, whose value matches the address ADR2, i,e, it matches the beginning of the signaling data set LST2, is stored in the memory cell 324 (compare arrow 325). The data of the connection data set SLST2 are used by a control program, which controls the connection during the three-party conference circuit. In addition to the reference data ADR-(S)LST, this control program enters two further reference data ADR-SLST1 or, respectively, ADR-SLST2 into the memory cell 326 or 328. The value of the reference data ADR-SLST1 matches the value of an address ADR4 at which the connection data set SLST3 starts. The value of the reference data ADR-SLST2 matches the value of an address ADR5 at which the connection data set SLST4 starts (compare arrows 330 and 332).

The reference data sets SLST3 and SLST4 are structured in the same way as the reference data set SLST1 explained on the basis of FIG. 5. However, FIG. 6 only shows one reference data ADR-(S)LST in a memory cell 334 of the reference data set SLST3 or in a memory cell 336 of the connection data set SLST4.

The reference data set SLST3 is utilized by a subscriber connection program, which controls the connection toward a first subscriber participating in the three-party conference on the B-side. As the value of the reference data ADR-(S)LST, the subscriber connection program VB1 enters the address ADR3 into the memory cell 334, so that the reference data ADR-(S)LST refers to the beginning of the connection data set SLST2 (compare arrow 338).

The connection data set SLST4 is utilized by a subscriber connection program, which controls the connection to a second subscriber of the three-party conference on the B-side. As the value of the reference data ADR-(S)LST, the subscriber connection program VB3 also enters the value of the address ADR3 into the memory cell 336. Thus, the reference data ADR-(S)LST of the connection data set SLST4 also refers to the beginning of the connection data set SLST2 (compare arrow 340).

Given an error-free operation of the switching center, the references indicated by the arrows 322, 325, 330, 332, 338 and 340 are shown as in FIG. 6. However, erroneous references can occur as a result of errors. On the basis of FIG. 7, it is explained below how the references can be checked. This is particularly important when more references than for a three-party conference are required with respect to other service features of the switching center.

Figure 7:
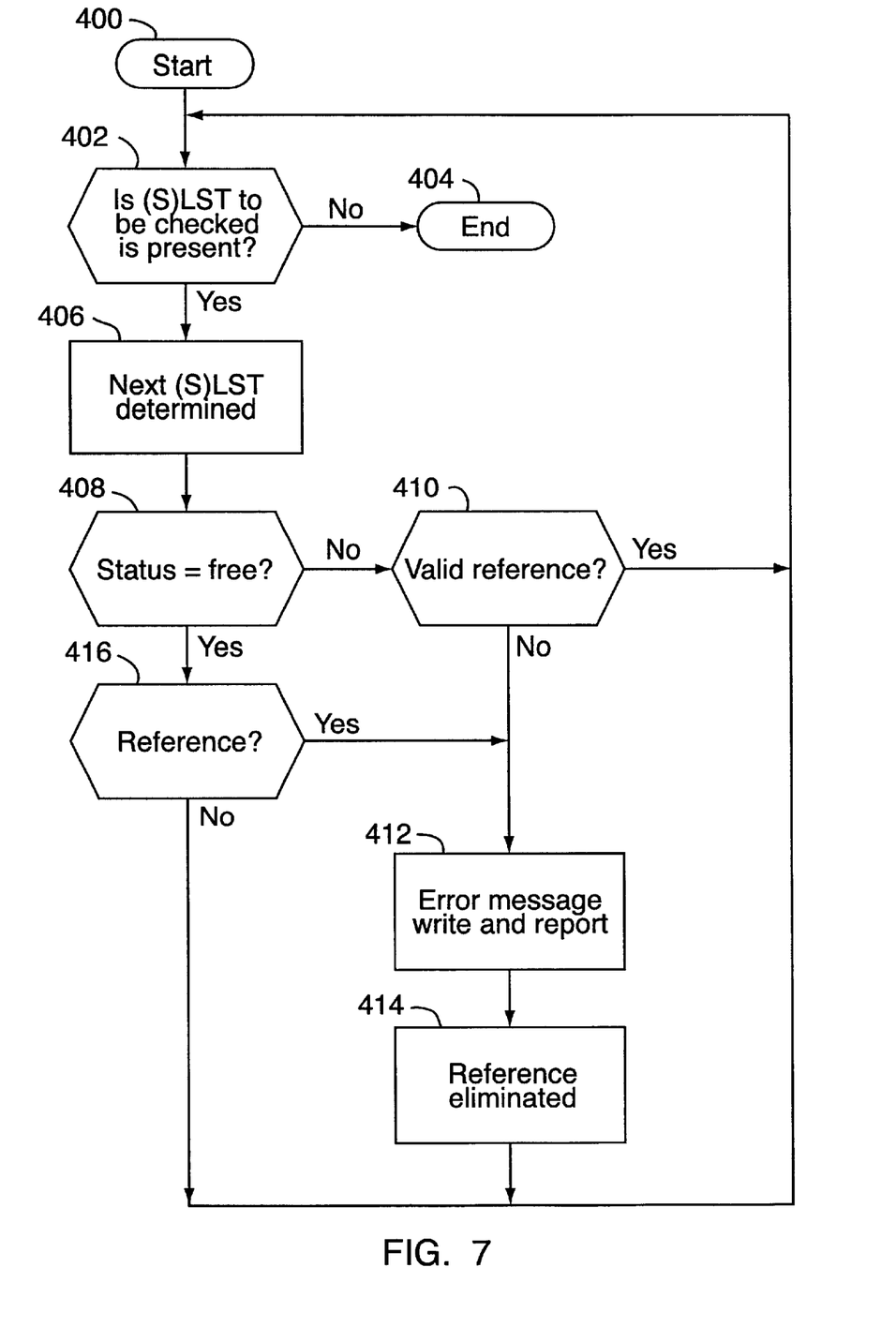
FIG. 7 depicts a flow diagram with method steps for checking the chaining of the data sets.

FIG. 7 shows a flow diagram with method steps for checking the references in signaling data sets LST and in connection data sets SLST. The method starts with the step 400, which is followed by step 402, which determines whether another data set to be checked is present. If this is not the case, i.e., all signaling data sets LST and all connection data sets SLST in the memory 204 have already been checked, the method is ended in a step 404. On the other hand, if it is determined in the method step 402 that further data sets to be checked are present, a method step 406 immediately follows the method step 402.

According to a fixed sequence, the next signaling data set LST1 or reference data set SLST is determined in the method step 406. A method step 408 follows accordingly.

On the basis of the status data in the processed data set LST or, SLST, it is determined in method step 408 whether the pertinent signaling program or, subscriber connection program is in an quiescent state. If this is not the case, the method step 408 is followed by a method step 410, in which it is checked whether the reference in the processed data set points to the beginning of another signaling data set or reference data set. If this is the case, the method step 410 is immediately followed again by the method step 402. The method is situated in a loop composed of the method steps 402 through 410.

The loop composed of the method steps 402 through 410 is left in step 410, where it is determined that there is no valid reference in the signaling or connection data set, although the program that belongs to this data set is not in the quiescentstatus. In this case, the method step 410 is immediately followed by a method step 412, in which an error message is written into an error file. Furthermore, the error message is also displayed on a printer or a control screen. This error message can be evaluated later by the maintenance personnel. The method step 412 is followed by a method step 414, in which the invalid reference is eliminated. The method step 414 is followed again by the method step 402.

The loop composed of the method steps 402 through 410 is also left in method step 408, where it is determined that the signaling program or, subscriber connection program pertinent to the just checked signaling data set LST or, connection data set SLST is in the quiescent status. In such a case, the method step 408 is immediately followed by a method step 416. It is checked in method step 416 whether the reference data has a value unequal to zero. If this is the case, then there is also a reference in the quiescent status. However, this is an error case, so that the step 416 is followed by the method steps 412 and 414 in order to write an error message into the file and to eliminate the reference in that the reference data receives the value zero. The method step 414 is followed by the method step 402.

On the other hand, if it is determined in the method step 416 that the reference data has the value zero, the method step 416 is immediately followed by the method step 402, since the reference data must have the value zero in the quiescent status, so that an error case is not present.

The method steps shown in FIG. 7 are carried out during the execution of a check program with the aid of a microprocessor, for example.

Although other modifications and changes may be suggested by those skilled in the art, it is the intention of the inventor to embody within the patent warranted hereon all changes and modifications as reasonably and properly come within the scope of their contribution to the art.

What is claimed is:

1. A method for checking a switching center, comprising the steps of:
    storing at least one signaling data set in a memory unit of the switching center, said at least one signaling data set including a first status data which indicates an operational status of an accessing signaling program, said at least one signaling data set including a first reference data referring to a connection data set, said at least one signaling data set being accessible by the accessing signaling program for signaling for a first subscriber;
    storing at least one connection data set in the memory unit of the switching center, said at least one connection data set being accessible by a connection program for a connection control between the first subscriber and a second subscriber;
    executing the following steps via a processor with respect to data of said at least one signaling data set:
        determining an operational status from said first status data;
        reading said first reference data;
        carrying out a first error treatment when said first reference data has a value that is inadmissible for a determined operational status.

2. A method according to claim 1, further comprising the step of:
    carrying out said steps of claim number 1 during a processing of a check program, said processing of the check program not being part of said accessing signaling program, said processing of the check program not being part of said connection program.

3. A method according to claim 1, wherein:
    said connection data set includes a second status data indicating a status of a pertinent subscriber connection program, said connection data set includes a second reference data referring to at least one of the signaling data set and a connection data set,
    the processor executes the following steps with respect to data of said connection data set:
        determining an operational status from said second status data;
        reading said second reference data;
        carrying out a second error treatment when said second reference data has a value that is inadmissible for a determined operational status.

4. A method according to claim 3, wherein the steps of claim 3 are being carried out with a cyclic repetition.

5. A method according to claim 3, wherein:
    a fixed value for at least one of the said first status data and the second status data indicates a quiescent state in which at least one of the accessing signaling program and the connection program is not utilized,
    only a fixed reference value is allowable in the said quiescent step for at least one of the said first reference data and the second reference data, said fixed reference value indicating that no reference is present,
    only reference values with respect to fixed storage space are allowable when an operational status deviates from a quiescent state.

6. A method according to claim 3, further comprising the step of:
    entering an error message in to an error file upon performing at least one of the said first error treatment step and said second error treatment step.

7. A method according to claim 3, further comprising the step of:
    writing in to a memory an allowable reference data upon performing at least one of the said first error treatment step and said second error treatment step.

8. A method according to claim 3, further comprising the step of:
    performing the steps of claim 3 via a line unit, said line unit comprising a memory unit and a processor.

9. A switching center comprising:
    a line unit including a memory unit and a processor, said line unit performs the steps of:
        storing at least one signaling data set in a memory unit of the switching center, said at least one signaling data set including a first status data which indicates an operational status of an accessing signaling program, said at least one signaling data set including a first reference data referring to a connection data set, said at least one signaling data set being accessible by the accessing signaling program for signaling for a first subscriber;
        storing at least one connection data set in the memory unit of the switching center, said at least one connection data set being accessible by a connection program for connection control for the first subscriber; said connection data set includes a second status data indicating a status of a pertinent subscriber connection program, said connection data set includes a second reference data referring to at least one of the signaling data set and a connection data set,
        executing the following steps with respect to data of said at least one signaling data set via a processor;
        determining an operational status from said first status data;
        reading said first reference data;
        carrying out an error treatment when said first reference data has a value that is inadmissible for a determined operational status,
        executing the following steps with respect to data of said connection data set via the processor;
        determining an operational status from said second status data;
        reading said second reference data;
        carrying out an error treatment when said second reference data has a value that is inadmissible for a determined operational status.

* * * * *